United States Patent [19]
Blair

[11] 3,717,228
[45] Feb. 20, 1973

[54] ATTACHE CASE CONVERTIBLE TO LUGGAGE DOLLY
[76] Inventor: Charles R. Blair, 24531 Corta Cresta Drive, Lake Forest, Calif. 92640
[22] Filed: April 2, 1971
[21] Appl. No.: 130,687

[52] U.S. Cl. .................. 190/1, 190/18 A, 190/41 R, 280/36 C, 280/47.27
[51] Int. Cl. ............................................. A45c 9/00
[58] Field of Search ....190/1, 49, 50, 41 R, 16, 18 A, 190/18 R; 280/36 C, 37; 206/45.11

[56] References Cited

UNITED STATES PATENTS

| | | | |
|---|---|---|---|
| 2,490,189 | 12/1949 | Alexander | 280/36 C |
| 513,726 | 1/1894 | Potts | 190/1 X |
| 598,964 | 2/1898 | Stern et al. | 280/37 |
| 715,967 | 12/1902 | Briggs | 190/16 X |
| 929,074 | 7/1909 | Brown et al. | 190/16 |
| 1,390,012 | 9/1921 | Borgerding | 190/16 |
| 2,539,302 | 1/1951 | Fye | 190/16 X |
| 3,172,680 | 3/1965 | Hire | 280/36 C |
| 3,177,000 | 4/1965 | Alexander | 280/36 C |

Primary Examiner—Joseph R. Leclair
Assistant Examiner—Stephen P. Garbe
Attorney—Carl R. Brown and Neil F. Martin

[57] ABSTRACT

An attache case of conventional proportions and appearance, which can be opened to form a wheeled luggage dolly with a load platform and an upright frame, having a handle at a convenient position. Simple latch and lock elements hold the structure securely in both of its uses.

7 Claims, 9 Drawing Figures

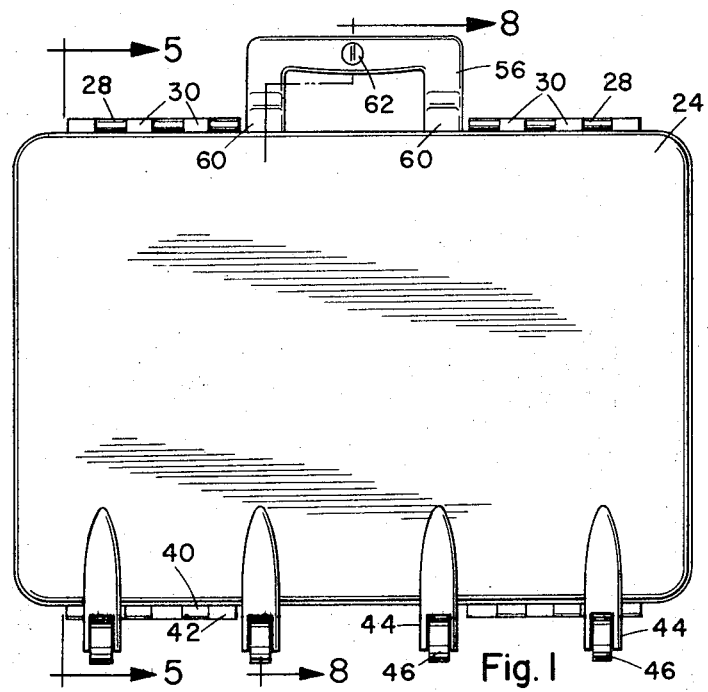
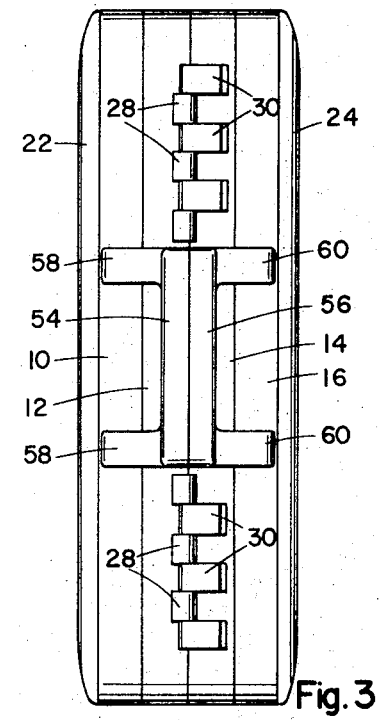
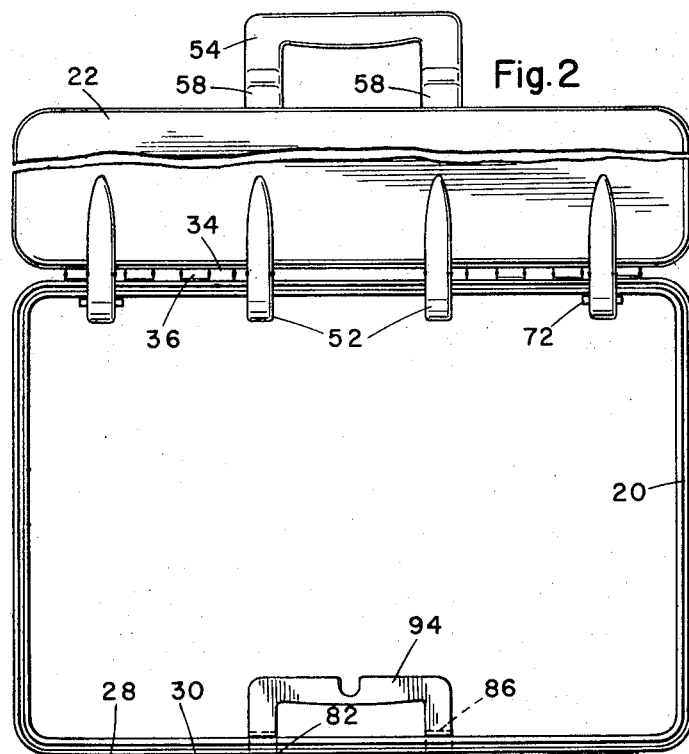
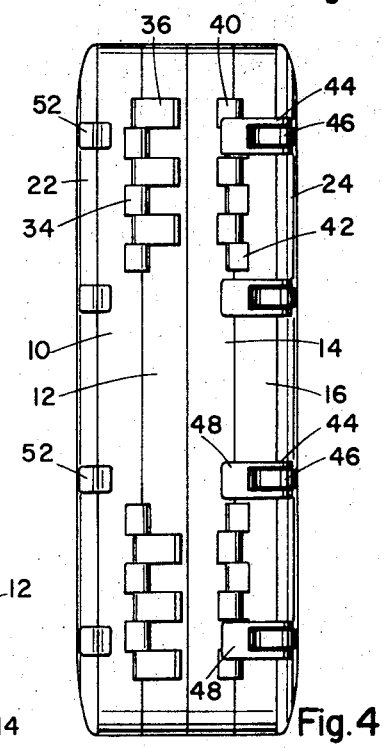
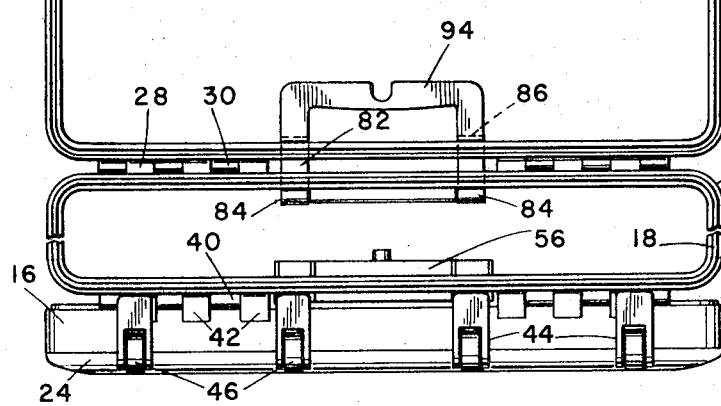
Fig. 1  Fig. 2  Fig. 3  Fig. 4
INVENTOR.
CHARLES R. BLAIR
BY Brown & Martin
ATTORNEYS PATENTED FEB 20 1973 3,717,228
SHEET 2 OF 2
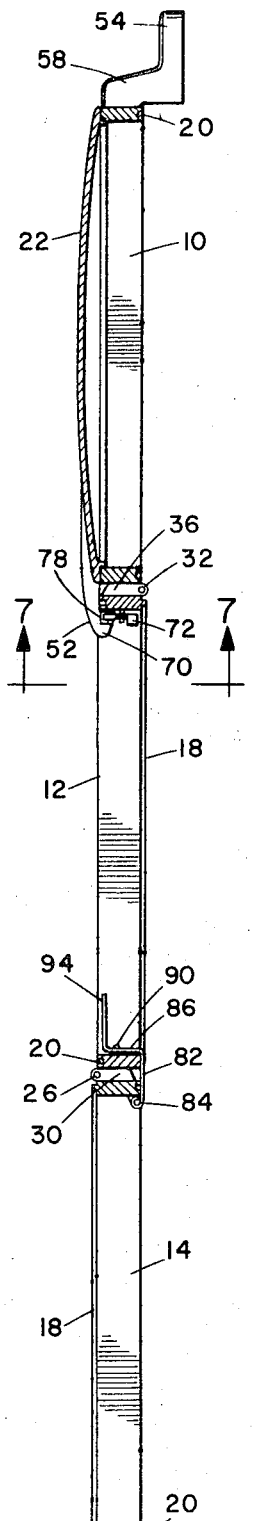
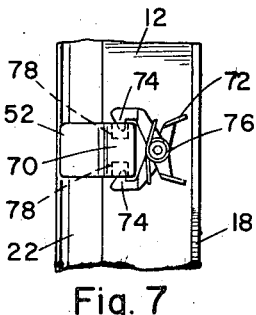
Fig. 7
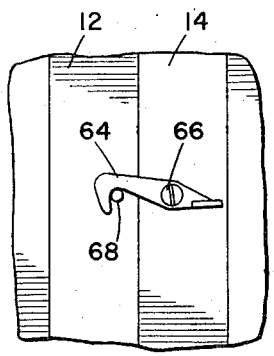
Fig. 9
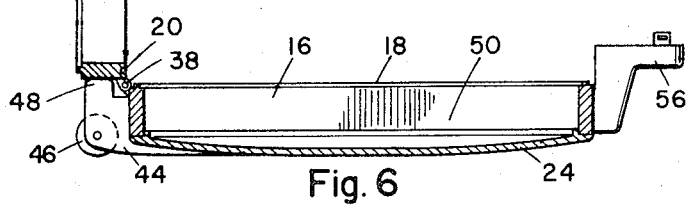
Fig. 5
Fig. 6
Fig. 8
INVENTOR.
CHARLES R. BLAIR
BY Brown & Martin
ATTORNEYS

ATTACHE CASE CONVERTIBLE TO LUGGAGE DOLLY

BACKGROUND OF THE INVENTION

Suitcases and similar items of luggage have been made with wheels which can be folded or detached when not in use. Such devices are often complex, occupy a considerable portion of the luggage and provide wheeled support only for a single item of luggage. In most instances the existing handle of the suitcase or other item is used to push and control the wheeled luggage, and is uncomfortably low for convenient handling.

SUMMARY OF THE INVENTION

The item of luggage described herein is basically an attache case or similar small suitcase, which can be opened to form a luggage dolly. The case is composed of interfitting frames hinged together in accordion configuration, so that one side forms a load platform and the other elements extend into an upright back frame structure, one handle portion of the case being at the top of the back structure at a convenient height for handling. Wheels and supporting feet are incorporated into the case in an unobtrusive manner and the wheels do not require any adjustment for use. Simple latch means hold the structure in both positions of use and a security lock is installed in the handle to lock the closed case.

The primary object of this invention, therefore, is to provide a new and improved attache case, which can be converted into a luggage dolly.

Another object of this invention is to provide a new and improved attache case having integral, non-adjustable wheels and simple latch means, which facilitate conversion to a luggage dolly.

A further object of this invention is to provide a new and improved luggage dolly of conventional proportions, capable of carrying several items of load.

Other objects and many advantages of this invention will become more apparent upon a reading of the following detailed description and an examination of the drawings, wherein like reference numerals designate like parts throughout.

FIG. 1 is a side elevation view of the closed case.
FIG. 2 is a rear view of the fully opened dolly.
FIG. 3 is a top plan view of the closed case.
FIG. 4 is a bottom plan view of the closed case.
FIG. 5 is a sectional view taken on line 5—5 of FIG. 1.
FIG. 6 is a sectional view similar to FIG. 5, but with the structure opened to form a dolly.
FIG. 7 is an enlarged sectional view taken on line 7—7 of FIG. 6.
FIG. 8 is an enlarged sectional view taken on line 8—8 of FIG. 1.
FIG. 9 is a view taken in the direction of arrows 9—9.

DESCRIPTION OF THE PREFERRED EMBODIMENT

The case, as shown, is composed of four basic frame elements, including a front frame 10, an inner frame 12, an inner frame 14 and a back frame 16. All the frames are generally similar and are of substantially rectangular configuration, although the shape may vary. Frames 12, 14 and 16 each has a peripheral tongue 18 protruding from one edge, to seat in a corresponding groove 20 in the confronting edge of the adjacent frame in the closed position, holding the assembled frames in close sealed alignment. The front frame 10 has a front cover 22 and the rear frame has a back cover 24 to form an enclosed case assembly with the frames. Covers 22 and 24 are shown as separate elements secured in their respective frames, but could be formed integrally with the frames depending on the material used.

Frames 12 and 14 are connected at the top along the center line of the case by a hinge pin 26 passing through hinge lugs 28 on frame 12 and interfitting hinge lugs 30 on frame 14. The hinge lugs 30 are extended across the width of frame 14 and have flat top faces, to act as spacing stops between frames 12 and 14 in the open position, as in FIG. 6. Frames 10 and 12 are similarly interconnected at the bottom by a hinge pin 32 through hinge lugs 34 on frame 10 and extended hinge lugs 36 on frame 12, the latter also acting as stops in the open position. The frames 14 and 16 are connected at the bottom by a hinge pin 38 through lugs 40 on frame 14 and similar lugs 42 on frame 16. The frames are thus connected in an accordion hinged configuration which is easily opened and closed.

Back cover 24 has longitudinally spaced, downwardly projecting fork elements 44, in each of which is a freely rotatable wheel 46, the wheels being on a common axis parallel to and substantially below the outer edge of frame 16. Each fork element 44 has an inwardly protruding stop block 48 which, in the open position of the structure, bears against the lower face of frame 14 to hold frame 16 perpendicular thereto. In open position, the frames 10, 12 and 14 are thus coplanar and upright, with the frame 16 extending horizontally to provide a load platform 50 at the lower end, as in FIG. 6. To support the closed case upright, the front cover 22 has feet 52 which project downwardly to the same distance as wheels 46, as in FIG. 8.

At the top of the case are abutting handle elements 54 and 56, joining along the center line, the handle element 54 having arms 58 which extend and are secured to the top of frame 10, and handle element 56 having similar extended arm 60 which are fixed to frame 16. The handle elements are thus attached to the outer frames and are secured together by a suitable lock 62, to close the upper portion of the case. Inside the lower portion of the case, a latch 64, pivotally mounted on a screw 66 on frame 14, engages a latch pin 68 on frame 12. Any suitable latch may be used, that shown in FIG. 9 being typical.

To lock the frames 10, 12 and 14 in extended coplanar relation, simple locking means are incorporated in the basic structure. Feet 52 have inwardly projecting lugs 70 which fit under the top portions of frame 12 when the structure is opened. On frame 12 are catches 72, each having jaws 74 which are biased by a spring 76 to seat in sockets 78 in the respective lug, as in FIGS. 6 and 7. Only two of the feet need be held by catches, in order to facilitate release by one person.

Frames 12 and 14 are locked open by a yoke having legs 82 which are attached by hinges 84 to the under-side of the top portion of frame 14. The yoke has horizontally extending arms 86 which fit closely over the frame 12 and have sockets 88 to snap-over lock pins 90 fixed in frame 12. The upper portion of the yoke is shaped to conform to the handle elements and, in the closed position of the case, is enclosed in a recess 92 in handle element 56. The handle portion 94 of the yoke extends above the bottom of frame 12 in extended position, as in FIGS. 2 and 6 and, when pushed inwardly, bends the arms 86 up to release them from lock pins 90.

In the closed position the case will rest upright on the feet 52 and wheels 46, or can be placed on its side. With lock 62 unlocked, the frame 10 can swing down on hinge pin 32 for access to the case, or frame 16 can swing down on hinge pin 38. A conventional folding pocket 96 may be installed in frame 10, as indicated in broken line in FIG. 8, for storage of selected items.

To convert the case to a dolly, it is necessary to release lock 62 and latch 64. Frame 16 is then swung down until stops 48 engage frame 14, and the frames 10, 12 and 14 are unfolded upwardly into coplanar alignment. The yoke snaps over lock pins 90 and catches 72 engage the lugs 70 to lock the upright frame structure in place. The handle element 54 is positioned at the top of the extended frame structure in a convenient gripping position. As shown in FIG. 6, the dolly rests on back cover 24 in upright position for loading. The wheels 46 can rest on the supporting surface for stabilization, but are not needed for support in this position. With the dolly loaded as required, the handle element 54 is pulled back to tilt the dolly on to the wheels 46, in which position the loaded dolly is easily rolled and handled in a normal manner.

To collapse the dolly, catches 72 are opened and yoke 80 is released, allowing frames 10, 12 and 14 to be folded. Latch 64 is engaged with pin 68 to lock the bottom of the case, then frame 16 is closed and lock 62 secured. The structure and operation are very simple and the case need not be much heavier than a conventional attache case. The frames and covers of the basic case are shown as being made of metal, such as aluminum alloy, with handles of plastic. However, various materials and combinations may be used to obtain light weight, while maintaining the necessary strength for the dolly configuration.

Having described my invention, I now claim.

1. An attache case convertible to a luggage dolly, comprising:

A case structure having a plurality of interconnected frames hinged together in accordion configuration;

support means on certain of said frames for holding the case in upright position;

a handle secured to the top of said case;

lock means securable between certain of said frames for holding the case closed;

stop means on one of said frames for holding that frame in an open load carrying position substantially perpendicular to the other frames;

retaining means on the other frames for holding them in extended coplanar alignment;

said support means including wheels engageable with a supporting surface in the open position of said one frame;

said frames include a front frame having an outer cover, a back frame having an outer cover, and a pair of open inner frames between said front and back frames;

the top portion of said inner frames being hinged together, and the bottom portions of said front and back frames being hinged to the respective inner frames.

2. An attache case according to claim 1, wherein said handle comprises a handle element fixed to said front frame, and a similar handle element fixed to said back frame, said handle elements extending over said inner frames and abutting in closed position; and lock means securing said handle elements together.

3. An attache case according to claim 1, wherein said wheels are mounted below said back frame in closed position, said support means including feet mounted on and extending below said front frame substantially level with said wheels.

4. An attache case according to claim 3, wherein said back frame has forks thereon in which said wheels are held, said forks having extended stop portions for engagement with the adjacent inner frame in the open position of the back frame.

5. An attache case according to claim 3, wherein said retaining means includes lugs on said feet, which protrude into the adjacent inner frame in the extended position, and catches on that inner frame for releasable locking engagement with said lugs.

6. An attache case according to claim 5, wherein said retaining means further includes a yoke pivotally attached to one of said inner frames at the common hinge thereof and having arms to fit closely over a portion of the other inner frame, said other inner frame having lock pins with which said arms are releasably engageable.

7. An attache case according to claim 6, wherein said yoke has a handle portion, said handle having a recess to receive said handle portion in the closed position of the case.

* * * * *